US012774014B2

(12) United States Patent
Tanabe

(10) Patent No.: US 12,774,014 B2
(45) Date of Patent: Oct. 27, 2026

(54) TRAVEL CONTROL DEVICE, TRAVEL CONTROL METHOD, AND NON-TRANSITORY RECORDING MEDIUM

(71) Applicant: TOYOTA JIDOSHA KABUSHIKI KAISHA, Toyota (JP)

(72) Inventor: Ken Tanabe, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/952,482

(22) Filed: Nov. 19, 2024

(65) Prior Publication Data

US 2025/0178643 A1 Jun. 5, 2025

(30) Foreign Application Priority Data

Nov. 30, 2023 (JP) ................................ 2023-202626

(51) Int. Cl.
*B60W 60/00* (2020.01)
*B60W 50/00* (2006.01)
*G06V 20/56* (2022.01)
*G06V 20/58* (2022.01)

(52) U.S. Cl.
CPC .. *B60W 60/00274* (2020.02); *B60W 50/0097* (2013.01); *B60W 60/0015* (2020.02); *G06V 20/582* (2022.01); *G06V 20/588* (2022.01); *B60W 2420/403* (2013.01); *B60W 2552/53* (2020.02); *B60W 2554/4046* (2020.02); *G06V 2201/07* (2022.01)

(58) Field of Classification Search
CPC ....... B60W 60/00274; B60W 50/0097; B60W 60/0015; B60W 2420/403; B60W 2552/53; B60W 2554/4046; B60W 30/09; B60W 30/0956; G06V 20/582; G06V 20/588; G06V 2201/07; G06V 20/58; G06V 20/584
See application file for complete search history.

(56) References Cited

U.S. PATENT DOCUMENTS 9,475,422 B2 * 10/2016 Hillis ....................... B60Q 1/26
9,969,326 B2 * 5/2018 Ross .................... B60Q 1/5037
11,340,089 B2 * 5/2022 Kunii ....................... B60Q 1/08
12,125,293 B2 * 10/2024 Shi ......................... G06N 3/045
2003/0146827 A1 8/2003 Koike
2016/0355181 A1 * 12/2016 Morales Teraoka ......................... B60W 30/0956
2017/0203685 A1 7/2017 Hirai et al.
2020/0371527 A1 11/2020 Kim
(Continued)

FOREIGN PATENT DOCUMENTS

JP 2003-231450 A 8/2003
JP 2008-047006 A 2/2008
(Continued)

*Primary Examiner* — Peter D Nolan
*Assistant Examiner* — Demetra R Smith-Stewart
(74) *Attorney, Agent, or Firm* — Dinsmore & Shohl LLP

(57) ABSTRACT

A travel control device includes an image recognition unit which performs image recognition of a pattern drawn on a road surface by light irradiated from a surrounding vehicle, a prediction unit which predicts behavior of the surrounding vehicle based on a result of the image recognition of the pattern, and a travel control unit which controls travel of a host vehicle based on the behavior of the surrounding vehicle.

6 Claims, 6 Drawing Sheets

(56) References Cited

U.S. PATENT DOCUMENTS

| | | | | |
|---|---|---|---|---|
| 2022/0144261 | A1* | 5/2022 | Fang | G06V 20/58 |
| 2022/0381415 | A1 | 12/2022 | Tatara | |
| 2024/0270157 | A1* | 8/2024 | Yamasaki | G06V 20/58 |

FOREIGN PATENT DOCUMENTS

| | | | |
|---|---|---|---|
| JP | 2009-151607 | A | 7/2009 |
| WO | 2016/027315 | A1 | 2/2016 |
| WO | 2020/218498 | A1 | 10/2020 |
| WO | 2021/166814 | A1 | 8/2021 |

* cited by examiner

TRAVEL CONTROL DEVICE, TRAVEL CONTROL METHOD, AND NON-TRANSITORY RECORDING MEDIUM

CROSS-REFERENCE TO RELATED APPLICATIONS

This application claims priority to Japanese Patent Application No. 2023-20262 6 filed Nov. 30, 2023, the entire contents of which are herein incorporated by reference.

FIELD

The present disclosure relates to travel control device, travel control method, and non-transitory recording medium.

BACKGROUND

PTL 1 (WO 2020/218498 A1) describes that a sensing system including a camera which shoots a video of a road surface and an arithmetic processing device is mounted on a vehicle (host vehicle), that a pattern drawn on the road surface by another traffic participant (for example, a surrounding vehicle, etc.) is included in the video shot by the camera, that the arithmetic processing device detects a state of the host vehicle and another traffic participant based on the pattern included in the video shot by the camera, and that the vehicle (host vehicle) equipped with a sensing system controls at least one of a steering, an accelerator, and a brake according to an output of the sensing system.

In the technique described in PTL 1, the pattern drawn on the road surface by another traffic participant is not intended to announce future behavior of another traffic participant (e.g., the surrounding vehicle as another traffic participant backing up, a door of the surrounding vehicle as another traffic participant (in detail, the surrounding vehicle in a state where the door is closed) opening and the like) in advance. Therefore, in the technique described in PTL 1, it is impossible for the host vehicle to predict the future behavior of another traffic participant based on the pattern drawn on the road surface by another traffic participant. As a result, in the technique described in PTL 1, it is impossible to appropriately control the traveling of the host vehicle based on the pattern drawn on the road surface by another traffic participant, and it is impossible to sufficiently improve travel safety of the host vehicle.

SUMMARY

In view of the above-described points, it is an object of the present disclosure to provide travel control device, travel control method, and non-transitory recording medium that can sufficiently improve travel safety of a host vehicle.

(1) One aspect of the present disclosure is a travel control device including a processor configured to: perform image recognition of a pattern drawn on a road surface by light irradiated from a surrounding vehicle; predict behavior of the surrounding vehicle based on a result of the image recognition of the pattern; and control travel of a host vehicle based on the behavior of the surrounding vehicle.

(2) In the travel control device of the aspect (1), the processor may be configured to cause the host vehicle to avoid the pattern drawn on the road surface by the light irradiated from the surrounding vehicle and travel.

(3) In the travel control device of the aspect (1) or (2), the processor may be configured to determine whether the pattern which is a target of the image recognition is a traffic sign.

(4) Another aspect of the present disclosure is a travel control method including: performing image recognition of a pattern drawn on a road surface by light irradiated from a surrounding vehicle; predicting behavior of the surrounding vehicle based on a result of the image recognition of the pattern; and controlling travel of a host vehicle based on the behavior of the surrounding vehicle.

(5) Another aspect of the present disclosure is a non-transitory recording medium having recorded thereon a computer program for causing a processor to execute a process including: performing image recognition of a pattern drawn on a road surface by light irradiated from a surrounding vehicle; predicting behavior of the surrounding vehicle based on a result of the image recognition of the pattern; and controlling travel of a host vehicle based on the behavior of the surrounding vehicle.

According to the present disclosure, it is possible to sufficiently improve travel safety of a host vehicle.

DESCRIPTION OF EMBODIMENTS

Figure 1:
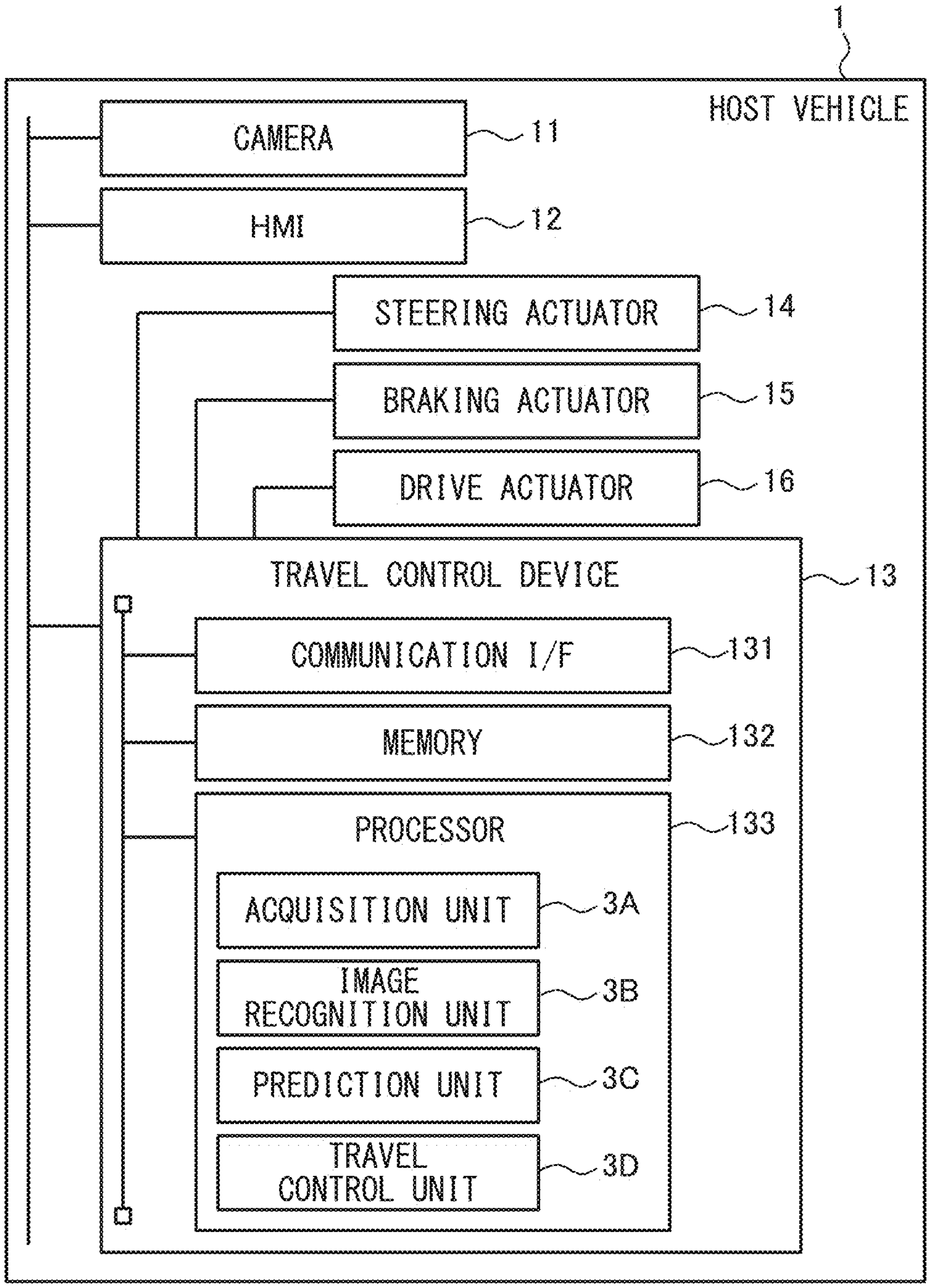
FIG. 1 is a view showing a first example of a host vehicle 1 to which a travel control device 13 of a first embodiment is applied.

Below, referring to the drawings, embodiments of travel control device, travel control method, and non-transitory recording medium of the present disclosure will be explained.

First Embodiment

FIG. 1 is a view showing a first example of a host vehicle 1 to which a travel control device 13 of a first embodiment is applied.

In the example shown in FIG. 1, the host vehicle 1 includes camera 11, HMI (Human Machine Interface) 12, the travel control device 13, steering actuator 14, braking actuator 15 and drive actuator 16.

The camera 11 shoots, for example, surroundings (e.g., front, side, rear, etc.) of the host vehicle 1 and transmits a camera image to the travel control device 13. The HMI 12 has a function of receiving various operations of a driver of the host vehicle 1 and transmits signals indicating the operations of the driver of the host vehicle 1 to the travel control device 13.

In the example shown in FIG. 1, the travel control device 13 is configured, for example, by a driving assistance ECU (Electronic Control Unit) (i.e., by one ECU).

In another example, the travel control device 13 may be configured, for example, by the driving assistance ECU and an image-processing ECU (i.e., by a plurality of ECUs).

In the example shown in FIG. 1, the travel control device 13 controls the steering actuator 14, the braking actuator 15, and the drive actuator 16 based on the camera image transmitted from the camera 11, the signals indicating the operations of the driver of the host vehicle 1 transmitted from the HMI 12, and the like. The steering actuator 14 has a function of steering the host vehicle 1. The steering actuator 14 includes, for example, power steering system, steer-by-wire steering system, rear wheel steering system, and the like. The braking actuator 15 has a function of decelerating the host vehicle 1. The braking actuator 15 includes, for example, hydraulic brake, power regenerative brake and the like. The drive actuator 16 has a function of accelerating the host vehicle 1. The drive actuator 16 includes, for example, engine, EV (electric vehicle) system, hybrid system, fuel-cell system and the like.

The travel control device 13 is configured by a microcomputer including communication interface (I/F) 131, memory 132 and processor 133. The communication interface 131 includes interface circuit for connecting the travel control device 13 to the camera 11, the HMI 12, the steering actuator 14, the braking actuator 15, the drive actuator 16, and the like. The memory 132 stores programs used in processes performed by the processor 133 and various data (e.g., the camera image transmitted from the camera 11). The processor 133 has function as an acquisition unit 3A, function as an image recognition unit 3B, function as a prediction unit 3C, and function as the travel control unit 3D.

The acquisition unit 3A acquires the camera image. The acquisition unit 3A acquires the signals indicating the operations of the driver of the host vehicle 1 (for example, operation to turn on/off the driving assistance function (for example, ACC (adaptive cruise control), FCW (forward collision warning), AEBS (collision damage reduction braking control device), emergency steering assistance (with an active steering function) and the like), steering operation, brake pedal operation, accelerator pedal operation and the like) that the HMI 12 receives.

The image recognition unit 3B recognizes a pattern PT (see FIG. 2 and FIG. 3) drawn on a road surface RS (see FIG. 2 and FIG. 3) by light irradiated from a surrounding vehicle SV (see FIG. 2 and FIG. 3) based on the camera image acquired by the acquisition unit 3A.

Figure 2:
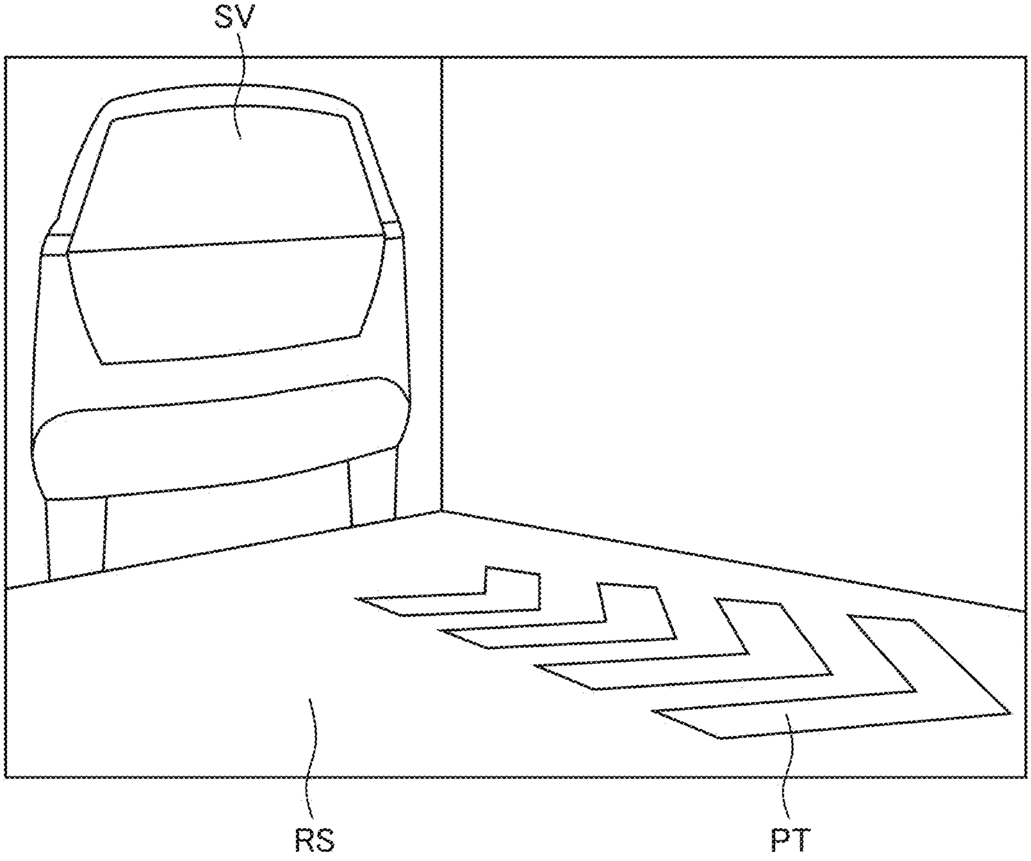
FIG. 2 is a view showing a first example of a pattern PT drawn on a road surface RS by light irradiated from a surrounding vehicle SV.

FIG. 2 is a view showing a first example of the pattern PT drawn on the road surface RS by the light irradiated from the surrounding vehicle SV.

In the example shown in FIG. 2, when the surrounding vehicle SV moves backward, the surrounding vehicle SV draws the pattern PT indicating that the surrounding vehicle SV moves backward on the road surface RS by irradiating the light and alerts pedestrian (not shown), vehicle (not shown) and the like around the surrounding vehicle SV in order to prevent an accident.

In the example shown in FIG. 1 (the first example of the host vehicle 1 to which the travel control device 13 of the first embodiment is applied), the image recognition unit 3B executes image recognition of the pattern PT (the pattern PT indicating that the surrounding vehicle SV moves backward) which is drawn on the road surface RS by the light irradiated from the surrounding vehicle SV included in the camera image acquired by the acquisition unit 3A by using a model obtained by performing learning using teacher data which is a dataset with a learning camera image and a label which indicates whether the pattern included in the learning camera image is the pattern PT which is drawn on the road surface RS by the light irradiated from a learning surrounding vehicle SV when the learning surrounding vehicle SV moves backward and which indicates that the learning surrounding vehicle SV moves backward as shown in FIG. 2.

In the example shown in FIG. 1, the prediction unit 3C predicts behavior of the surrounding vehicle SV based on a result of the image recognition of the pattern PT executed by the image recognition unit 3B.

Specifically, in the example shown in FIG. 1, when the image recognition of the pattern PT indicating that the surrounding vehicle SV moves backward is executed by the image recognition unit 3B, the prediction unit 3C predicts that the surrounding vehicle SV moves backward as the behavior of the surrounding vehicle SV.

In the example shown in FIG. 1, the travel control unit 3D controls travel of the host vehicle 1 based on the behavior of the surrounding vehicle SV predicted by the prediction unit 3C.

Specifically, in the example shown in FIG. 1, when the prediction unit 3C predicts that the surrounding vehicle SV moves backward as the behavior of the surrounding vehicle SV, the travel control unit 3D causes the host vehicle 1 to travel avoiding the pattern PT (the pattern PT indicating that the surrounding vehicle SV moves backward) which is drawn on the road surface RS by the light irradiated from the surrounding vehicle SV. In other words, the travel control unit 3D causes the host vehicle 1 to travel so that the host vehicle 1 does not touch the surrounding vehicle SV when the surrounding vehicle SV moves backward.

Specifically, for example, when the ACC and the emergency steering assistance are in the ON state, the travel control unit 3D controls the steering actuator 14 and the braking actuator 15 so that the host vehicle 1 travels by avoiding the pattern PT indicating that the surrounding vehicle SV moves backward without the need for the driver of the host vehicle 1 to perform the steering operation and the brake pedal operation.

In another example, when the driving assistance function is in the ON state, the driving control unit 3D may cause the HMI 12 to output an alert to prompt the driver of the host vehicle 1 to perform the steering operation and the brake pedal operation for the host vehicle 1 to travel avoiding the pattern PT indicating that the surrounding vehicle SV moves backward.

Figure 3:
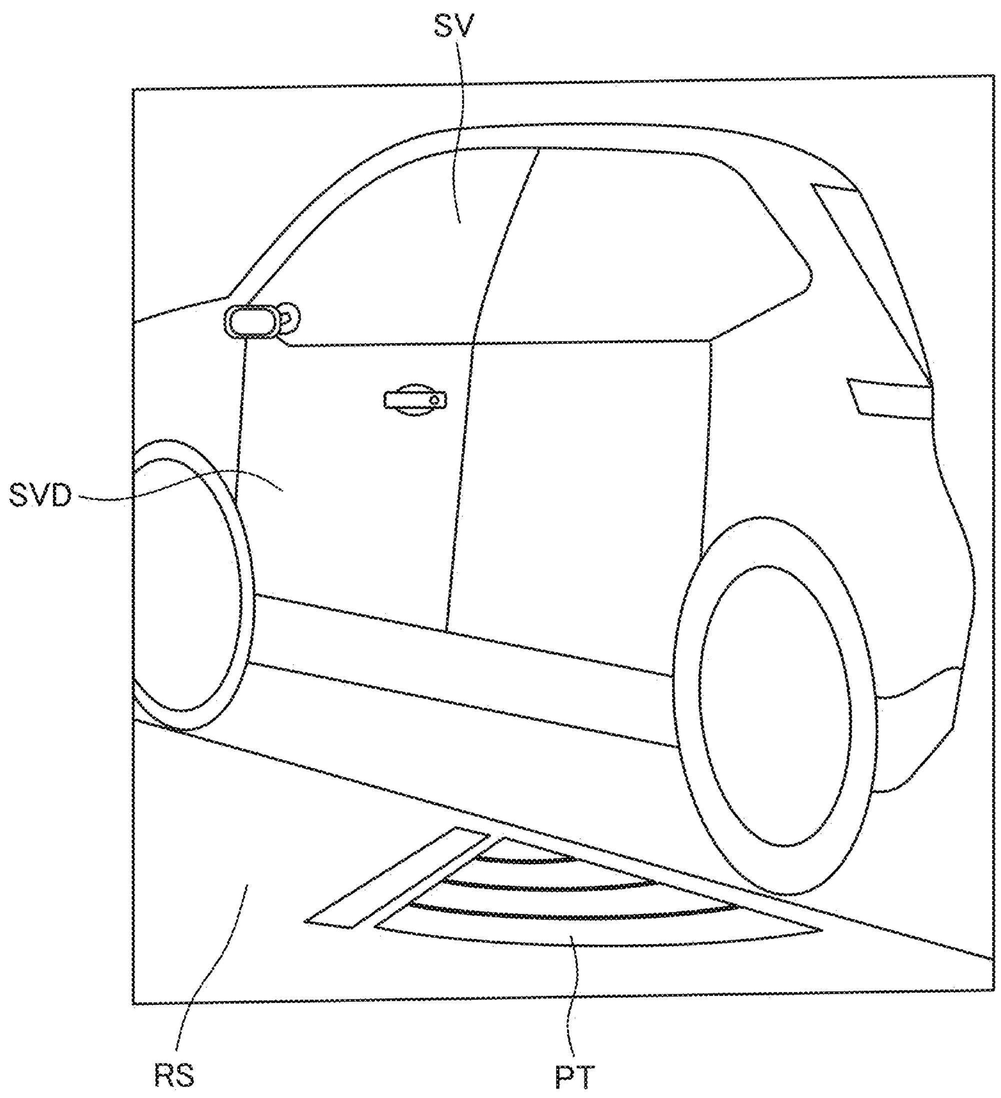
FIG. 3 is a view showing a second example of the pattern PT drawn on the road surface RS by the light irradiated from the surrounding vehicle SV.

FIG. 3 is a view showing a second example of the pattern PT drawn on the road surface RS by the light irradiated from the surrounding vehicle SV.

In the example shown in FIG. 3, when there is a possibility that an occupant of the surrounding vehicle SV opens a door SVD of the surrounding vehicle SV, the surrounding vehicle SV draws the pattern PT indicating that the door SVD of the surrounding vehicle SV opens on the road surface RS by irradiating the light and alerts the pedestrian (not shown), the vehicle (not shown) and the like around the surrounding vehicle SV in order to prevent the accident.

In the second example of the host vehicle 1 to which the travel control device 13 of the first embodiment is applied, the image recognition part 3B executes the image recognition of the pattern PT (the pattern PT indicating that the door SVD of the surrounding vehicle SV opens) which is drawn on the road surface RS by the light irradiated from the surrounding vehicle SV included in the camera image acquired by the acquisition unit 3A by using the model obtained by performing the learning using the teacher data which is the dataset with the learning camera image and the label which indicates whether the pattern included in the learning camera image is the pattern PT which is drawn on the road surface RS by the light irradiated from the learning surrounding vehicle SV when there is the possibility that the occupant of the learning surrounding vehicle SV opens the door SVD of the learning surrounding vehicle SV and which indicates that the door SVD of the learning surrounding vehicle SV opens as shown in FIG. 3.

In the second example of the host vehicle 1 to which the travel control device 13 of the first embodiment is applied, when the image recognition of the pattern PT indicating that the door SVD of the surrounding vehicle SV opens is executed by the image recognition unit 3B, the prediction unit 3C predicts that the door SVD of the surrounding vehicle opens as the behavior of the surrounding vehicle SV.

In the second example of the host vehicle 1 to which the travel control device 13 of the first embodiment is applied, when the prediction unit 3C predicts that the door SV of the surrounding vehicle SV opens as the behavior of the surrounding vehicle SV, the travel control unit 3D causes the host vehicle 1 to travel avoiding the pattern PT (the pattern PT indicating that the door SVD of the surrounding vehicle SV opens) which is drawn on the road surface RS by the light irradiated from the surrounding vehicle SV. In other words, the travel control unit 3D causes the host vehicle 1 to travel so that the host vehicle 1 does not touch the door SVD of the surrounding vehicle SV when the door SVD of the surrounding vehicle SV opens.

Specifically, for example, when the ACC and the emergency steering assistance are in the ON state, the travel control unit 3D controls the steering actuator 14 and the braking actuator 15 so that the host vehicle 1 travels by avoiding the pattern PT indicating that the door SVD of the surrounding vehicle SV opens without the need for the driver of the host vehicle 1 to perform the steering operation and the brake pedal operation.

In another example, when the driving assistance function is in the ON state, the driving control unit 3D may cause the HMI 12 to output the alert to prompt the driver of the host vehicle 1 to perform the steering operation and the brake pedal operation for the host vehicle 1 to travel avoiding the pattern PT indicating that the door SVD of the surrounding vehicle SV opens.

Figure 4:
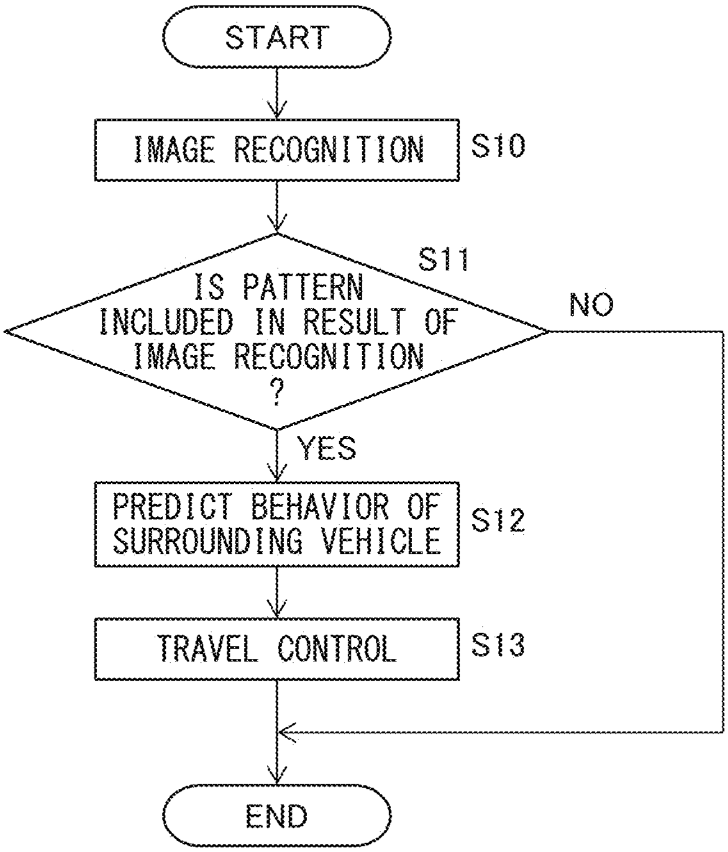
FIG. 4 is a flowchart for explaining an example of a process executed by a processor 133 of the travel control device 13 of the first embodiment.

FIG. 4 is a flowchart for explaining an example of a process executed by the processor 133 of the travel control device 13 of the first embodiment.

In the example shown in FIG. 4, at step S10, the image recognition unit 3B executes the image recognition of the pattern PT (see FIG. 2 and FIG. 3) drawn on the road surface RS (see FIG. 2 and FIG. 3) by the light irradiated from the surrounding vehicle SV (see FIG. 2 and FIG. 3) based on the camera image acquired at step not shown.

At step S11, the image recognition unit 3B determines whether the pattern PT drawn on the road surface RS by the light irradiated from the surrounding vehicle SV is included in the result of the image recognition performed at step S10. If YES, it proceeds to step S12, while if NO, the process shown in FIG. 4 is ended.

At step S12, the prediction unit 3C predicts the behavior of the surrounding vehicle SV based on the result of the image recognition of the pattern PT performed at step S10.

At step S13, the travel control unit 3D controls the travel of the host vehicle 1 based on the behavior of the surrounding vehicle SV predicted at step S12.

In the host vehicle 1 to which the travel control device 13 of the first embodiment is applied, the prediction of the behavior of the surrounding vehicle SV is performed, the travel of the host vehicle 1 is controlled based on the predicted behavior of the surrounding vehicle SV. Therefore, it is possible to sufficiently improve the travel safety of the host vehicle 1 compared with a case in which the prediction of the behavior of the surrounding vehicle SV is not performed.

Second Embodiment

The host vehicle 1 to which the travel control device 13 of a second embodiment is applied is configured similarly to the host vehicle 1 to which the travel control device 13 of the first embodiment described above is applied, except for the points mentioned below.

Figure 5:
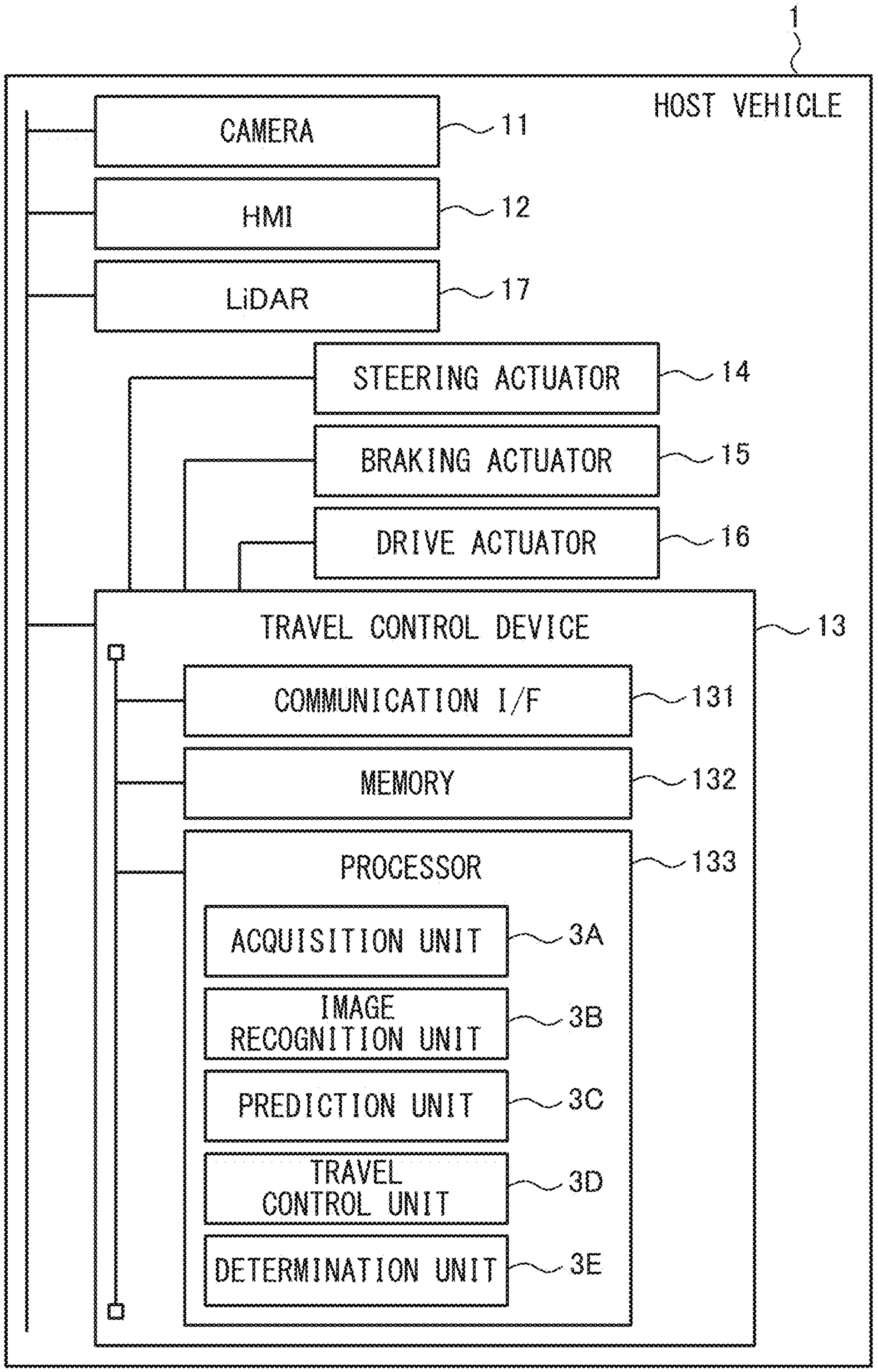
FIG. 5 is a view showing an example of the host vehicle 1 to which the travel control device 13 of a second embodiment is applied.

FIG. 5 is a view showing an example of the host vehicle 1 to which the travel control device 13 of the second embodiment is applied.

In the example shown in FIG. 1, the host vehicle 1 is not provided with a LiDAR (Laser Imaging Detection and Ranging) 17 (refer to FIG. 5), but in the example shown in FIG. 5, the host vehicle 1 is provided with the LiDAR 17. The LiDAR 17 detects a surrounding situation of the host vehicle 1 and transmits the detection result to the travel control device 13. The acquisition unit 3A acquires the detection result of the LiDAR 17.

In the example shown in FIG. 1, the processor 133 does not have a function as a determination unit 3E (see FIG. 5), but in the example shown in FIG. 5, the processor 133 has the function as the determination unit 3E. The determining unit 3E determines whether the pattern PT (refer to FIG. 2 and FIG. 3) the image recognition of which is performed by the image recognition unit 3B is a traffic sign (e.g., compartment line, road surface marking, etc.).

Specifically, when the intensity of reflected light from the pattern PT and the intensity of the reflected light from a part other than the pattern PT among the road surface RS (see FIG. 2 and FIG. 3) received by a light receiving section (not shown) of the LiDAR 17 are the same, the determination unit 3E determines that the pattern PT recognized by the image recognition unit 3B is not road surface painting (the traffic sign) but the pattern PT drawn on the road surface RS by the light irradiated from the surrounding vehicle SV.

When the intensity of the reflected light from the pattern PT and the intensity of the reflected light from the part other than the pattern PT among the road surface RS received by the light receiving section of the LiDAR 17 are very different, the determining unit 3E determines that the pattern PT recognized by the image recognition unit 3B is the road surface painting (the traffic sign).

Figure 6:
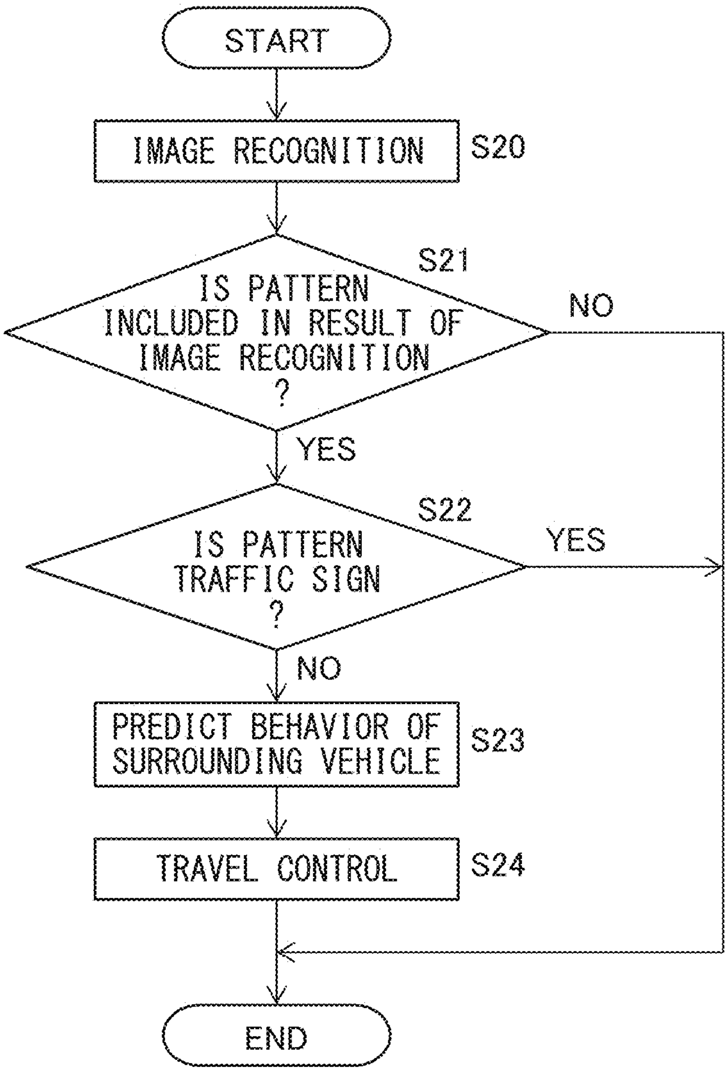
FIG. 6 is a flowchart for explaining an example of the process executed by the processor 133 of the travel control device 13 of the second embodiment.

FIG. 6 is a flowchart for explaining an example of the process executed by the processor 133 of the travel control device 13 of the second embodiment.

In the example shown in FIG. 6, at step S20, the image recognition unit 3B performs the image recognition of the pattern PT drawn on the road surface RS by the light irradiated from the surrounding vehicle SV based on the camera image acquired at step not shown.

At step S21, the image recognition unit 3B determines whether the pattern PT drawn on the road surface RS by the light irradiated from the surrounding vehicle SV is included in the result of the image recognition performed at step S20. If YES, it proceeds to step S22, while if NO, the process shown in FIG. 6 is ended.

At step S22, the determination unit 3E determines whether the pattern PT recognized at step S20 is the traffic sign (e.g., the compartment line, the road surface marking, etc.). If NO, it proceeds to step S23, while if YES, the process shown in FIG. 6 is ended.

At step S23, the prediction unit 3C predicts the behavior of the surrounding vehicle SV based on the result of the image recognition of the pattern PT performed at step S20.

At step S24, the travel control unit 3D controls the travel of the host vehicle 1 based on the behavior of the surrounding vehicle SV predicted at step S23.

In the host vehicle 1 to which the travel control device 13 of the second embodiment is applied as described above, when the determination unit 3E determines that the pattern PT recognized by the image recognition unit 3B is not the traffic sign (for example, the compartment line, the road surface marking, etc.), the travel control unit 3D executes the travel control of the host vehicle 1 based on the behavior of the surrounding vehicle SV. Therefore, it is possible to suppress the risk of misrecognition of the traffic sign (for example, the compartment line, the road surface marking, etc.) as the pattern PT drawn on the road surface RS by the light irradiated from the surrounding vehicle SV and the risk of improper execution of the travel control of the host vehicle 1 based on the result of the misrecognition.

Third Embodiment

The host vehicle 1 to which the travel control device 13 of a third embodiment is applied is configured similarly to the host vehicle 1 to which the travel control device 13 of the first embodiment described above is applied, except for the points mentioned below.

In the example shown in FIG. 1 (the first example of the host vehicle 1 to which the travel control device 13 of the first embodiment is applied), the processor 133 does not have the function as the determination unit 3E (see FIG. 5), but in an example of the host vehicle 1 to which the travel control device 13 of the third embodiment is applied, the processor 133 has the function as the determination unit 3E. The determination unit 3E determines whether the pattern PT the image recognition of which is performed by the image recognition unit 3B (refer to FIG. 2 and FIG. 3) is the traffic sign (e.g. the compartment line, the road surface marking, etc.), similar to the example shown in FIG. 5.

In the example of the host vehicle 1 to which the travel control device 13 of the third embodiment is applied, the determination unit 3E determines whether the pattern PT (see FIG. 2 and FIG. 3) recognized by the image recognition unit 3B is the traffic sign (for example, the compartment line, the road surface marking, or the like) by using a machine learning model, unlike the example shown in FIG. 5. Specifically, the determination unit 3E determines whether the pattern PT recognized by the image recognition unit 3B is the traffic sign by using the learning model obtained by performing the learning using the teacher data which is the dataset with the learning camera image and a label which indicates whether the pattern included in the learning camera image is the pattern PT drawn on the road surface RS by the light irradiated from the learning surrounding vehicle SV or the road surface painting (the traffic sign).

In the example of the host vehicle 1 to which the travel control device 13 of the third embodiment is applied, when the determination unit 3E determines that the pattern PT recognized by the image recognition unit 3B is not the traffic sign, the prediction unit 3C predicts the behavior of the surrounding vehicle SV and the travel control unit 3D controls the travel of the host vehicle 1.

Fourth Embodiment

The host vehicle 1 to which the travel control device 13 of a fourth embodiment is applied is configured similarly to the host vehicle 1 to which the travel control device 13 of the third embodiment described above is applied, except for the points mentioned below.

In the example of the host vehicle 1 to which the travel control device 13 of the third embodiment is applied, as described above, the determination unit 3E determines whether the pattern PT (see FIG. 2 and FIG. 3) recognized by the image recognition unit 3B is the traffic sign (e.g., the compartment line, the road surface marking, etc.) by using the machine learning model.

On the other hand, in an example of the host vehicle 1 to which the travel control device 13 of the fourth embodiment is applied, the determination unit 3E determines whether the pattern PT recognized by the image recognition unit 3B is the traffic sign based on presence or absence of time variation of relative positional relationship between the pattern PT recognized by the image recognition unit 3B and the surrounding vehicle SV. When the time variation of the relative positional relationship between the pattern PT recognized by the image recognition unit 3B and the surrounding vehicle SV exists (more detail, when the position of the pattern PT does not change but the position of the surrounding vehicle SV changes), the determination unit 3E determines that the pattern PT recognized by the image recognition unit 3B is the traffic sign.

Fifth Embodiment

The host vehicle 1 to which the travel control device 13 of a fifth embodiment is applied is configured similarly to the host vehicle 1 to which any one of the travel control devices 13 of the first to the fourth embodiments described above is applied, except for the points mentioned below.

In the host vehicle 1 to which any one of the travel control devices 13 of the first to the fourth embodiments is applied as described above, the travel control device 13 is configured by, for example, the driving assistance ECU.

On the other hand, in the host vehicle 1 to which the travel control device 13 of the fifth embodiment is applied, the travel control device 13 is configured by, for example, an autonomous driving ECU. The travel control device 13 controls the steering actuator 14, the braking actuator 15, and the drive actuator 16 based on the camera image transmitted from the camera 11, a signal indicating an operation of putting the host vehicle 1 in an autonomous driving mode by the driver of the host vehicle 1 transmitted from the HMI 12 and the like.

In the host vehicle 1 to which the travel control device 13 of the fifth embodiment is applied, the acquisition unit 3A acquires the signal indicating the operation of the driver of the host vehicle 1 received by the HMI 12 (for example, the operation of putting the host vehicle 1 in the autonomous driving mode, the operation of canceling the autonomous driving mode of the host vehicle 1, and the like).

In an example of the host vehicle 1 to which the travel control device 13 of the fifth embodiment is applied, when the prediction unit 3C predicts that the surrounding vehicle SV moves backward as the behavior of the surrounding vehicle SV, the travel control unit 3D generates a travel plan for traveling the host vehicle 1 avoiding the pattern PT (the pattern PT indicating that the surrounding vehicle SV moves backward) drawn on the road surface RS by the light irradiated from the surrounding vehicle SV, and controls the steering actuator 14 and the braking actuator 15 based on the travel plan.

In another example of the host vehicle 1 to which the travel control device 13 of the fifth embodiment is applied, when the prediction unit 3C predicts that the door SVD of the surrounding vehicle SV opens as the behavior of the surrounding vehicle SV, the travel control unit 3D generates the travel plan for traveling the host vehicle 1 avoiding the pattern PT (the pattern PT indicating that the door SVD of the surrounding vehicle SV opens) drawn on the road surface RS by the light irradiated from the surrounding vehicle SV, and controls the steering actuator 14 and the braking actuator 15 based on the travel plan.

As described above, although the embodiments of the travel control device, the travel control method, and the non-transitory recording medium of the present disclosure have been described with reference to the drawings, the travel control device, the travel control method, and the non-transitory recording medium of the present disclosure are not limited to the embodiments described above, and may be appropriately changed without departing from the scope of the present disclosure. The configuration of each example of the embodiment described above may be appropriately combined. In each example of the embodiments described above, the process performed in the travel control device 13 (e.g., the driving assistance ECU, the autonomous driving ECU, etc.) has been described as a software process performed by executing the programs, the process performed in the travel control device 13 may be a process performed by hardware. Alternatively, the process performed by the travel control device 13 may be a combined process of both software and hardware. Further, the programs (the programs for realizing the function of the processor 133 of the travel control device 13) that is stored in the memory 132 of the travel control device 13 may be recorded in a computer-readable storage medium (a non-transitory recording medium) such as, for example, a semiconductor memory, a magnetic recording medium, an optical recording medium, or the like for providing, distribution or the like.

The invention claimed is:

1. A travel control device comprising a processor configured to:

perform image recognition of a pattern drawn on a road surface by light irradiated from a surrounding vehicle;

predict behavior of the surrounding vehicle based on a result of the image recognition of the pattern; and control travel of a host vehicle based on the behavior of the surrounding vehicle.

2. The travel control device according to claim 1, wherein the processor is configured to cause the host vehicle to avoid the pattern drawn on the road surface by the light irradiated from the surrounding vehicle and travel.

3. The travel control device according to claim 1, wherein the processor is configured to determine whether the pattern which is a target of the image recognition is a traffic sign.

4. The travel control device according to claim 1, wherein the processor is configured to:

acquire a camera image; and recognize the pattern drawn on the road surface by light irradiated from the surrounding vehicle based on the camera image acquired.

5. A travel control method comprising:

performing image recognition of a pattern drawn on a road surface by light irradiated from a surrounding vehicle;

predicting behavior of the surrounding vehicle based on a result of the image recognition of the pattern; and controlling travel of a host vehicle based on the behavior of the surrounding vehicle.

6. A non-transitory recording medium having recorded thereon a computer program for causing a processor to execute a process comprising:

performing image recognition of a pattern drawn on a road surface by light irradiated from a surrounding vehicle;

predicting behavior of the surrounding vehicle based on a result of the image recognition of the pattern; and controlling travel of a host vehicle based on the behavior of the surrounding vehicle.

* * * * *